United States Patent [19]

Shirn

[11] 3,970,903
[45] July 20, 1976

[54] SOLID ELECTROLYTIC CAPACITOR WITH EMBEDDED COUNTERELECTRODE

[75] Inventor: George A. Shirn, Williamstown, Mass.

[73] Assignee: Sprague Electric Company, North Adams, Mass.

[22] Filed: Jan. 10, 1975

[21] Appl. No.: 540,028

Related U.S. Application Data

[63] Continuation-in-part of Ser. No. 382,782, July 26, 1973, abandoned.

[52] U.S. Cl. ................................. 317/230; 29/57
[51] Int. Cl.[2] ................................. H01G 9/00
[58] Field of Search ................. 317/230; 29/570

[56] References Cited
UNITED STATES PATENTS

| | | | |
|---|---|---|---|
| 2,936,514 | 5/1960 | Millard | 317/230 |
| 3,139,568 | 6/1964 | Ishikawa | 317/230 |
| 3,182,235 | 5/1965 | Mohler et al. | 317/230 |
| 3,189,797 | 6/1965 | Okamoto et al. | 317/230 |
| 3,573,566 | 4/1971 | Fournier | 317/230 |
| 3,585,468 | 6/1971 | Chertok | 317/230 |
| 3,612,957 | 10/1971 | Steigerwald | 317/230 |

*Primary Examiner*—Andrew J. James
*Attorney, Agent, or Firm*—Connolly and Hutz

[57] ABSTRACT

A solid electrolyte tantalum capacitor comprises a porous tantalum body, a tantalum oxide film grown over the surfaces of the body, and an overlying coating of manganese dioxide wherein a conducting member is partially embedded. The conducting counterelectrode member is of a base metal such as nickel being plated with a noble metal such as gold. Alternatively, the conducting member is a base metal having an adjacent layer of graphite interposed between said base metal and said manganese dioxide. An extended portion of the conducting member serves as the cathode lead.

11 Claims, 6 Drawing Figures

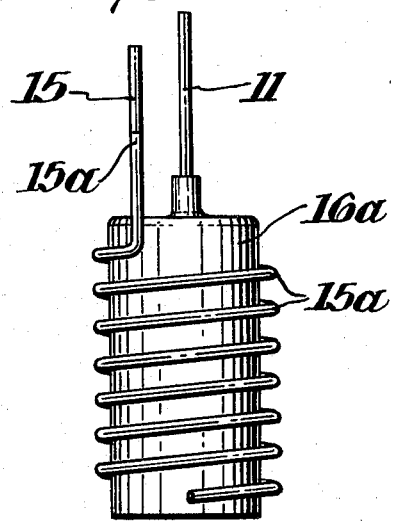
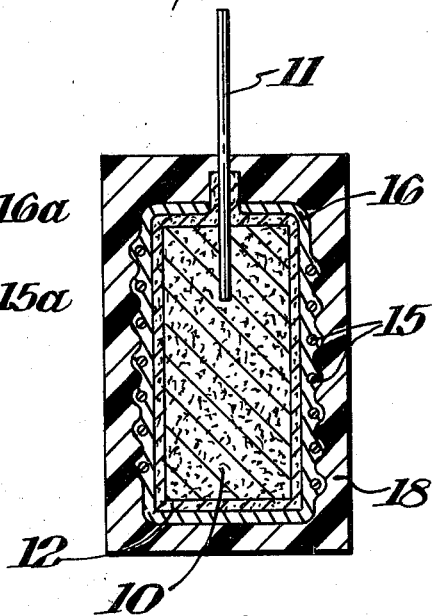
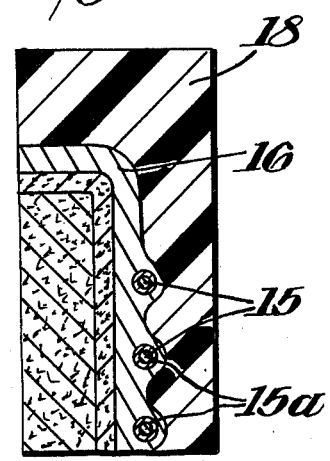
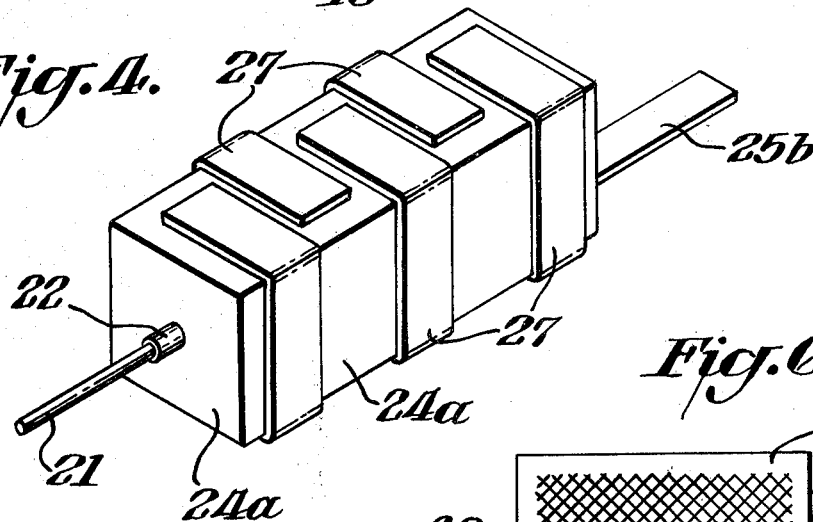
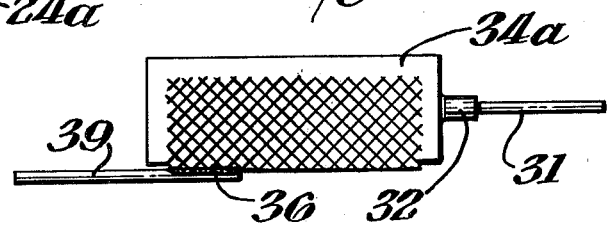
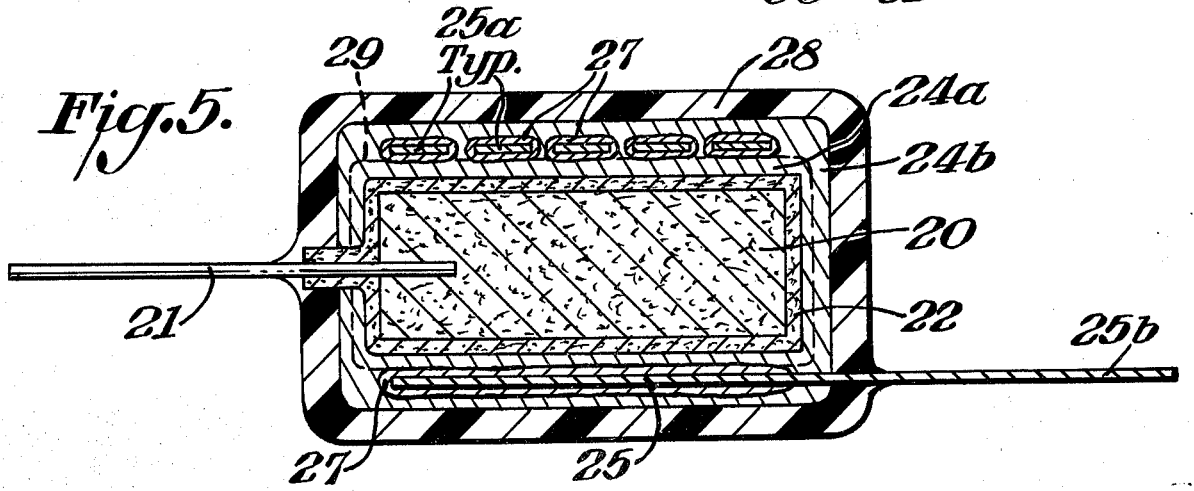

SOLID ELECTROLYTIC CAPACITOR WITH EMBEDDED COUNTERELECTRODE

CROSS REFERENCE TO RELATED APPLICATIONS

This application is a continuation-in-part of my copending application Ser. No. 382,782, filed July 26, 1973, now abandoned.

BACKGROUND OF THE INVENTION

This invention relates to solid electrolyte valve-metal capacitors, and more particularly to tantalum capacitors having a solid manganese dioxide electrolyte.

It is well known that a solid electrolytic valve-metal capacitor may be manufactured by the following method. A sintered porous tantalum body is anodized forming a film of tantalum oxide over all its exposed surfaces. Several coatings of a manganous nitrate solution are applied over the tantalum oxide including regions in the pores of the tantalum body. The body is fired at a temperature of about 400°C, pyrolyzing and transforming the manganous nitrate to a semiconductor, namely manganese dioxide ($MnO_2$). A layer of graphite is applied over the $MnO_2$ and a layer of a paste containing silver particles is further applied over the graphite and fired to form a solderable counterelectrode to which a cathode lead wire may be readily attached.

The aforementioned conventional process provides a method for making a conductive and physically secure connection between a substantial portion of the outer coating of $MnO_2$ and a cathode lead. The steps of applying graphite, silver and then solder solves the major problems inherent in making effective connection to $MnO_2$.

The use of graphite to contact $MnO_2$ is universally and exclusively used, to our knowledge, in the manufacture of conventional solid electrolyte $MnO_2$ valve metal capacitors as represented in the above example. $MnO_2$ is easily reduced to a non-conducting material. More particularly most metals will reduce $MnO_2$ as will the vapors of solder fluxes and the polymeric compounds typically used for housings, especially at elevated temperatures. Most capacitors are soldered into the circuits of their application and are exposed, sometimes for several minutes, to temperatures as high as 360°C, which tends to generate vapors of organic materials that are incorporated in the package. Such vapors generally diffuse through the intervening counterelectrode layers. The resulting reduction of the $MnO_2$ will cause a large increase in the dissipation factor and in the high-frequency impedance of the capacitor. The conventional steps for forming an effective counterelectrode tend to be costly in material and effort, and such conventional solid valve metal capacitors are subject to degradation in performance, especially at elevated temperatures required for soldering the capacitor in a circuit.

A known method for simplifying the counterelectrode structure consists in applying graphite over the $MnO_2$ as was previously described but then applying a metal such as solder containing large amounts of lead, copper, and brass. A metal wire is embedded in the metal coating, serving as the cathode lead. This structure has the potential for preventing organic vapors from reaching the $MnO_2$ since a thick layer of solder may be relatively impervious to gasses depending upon the method used for the metallization. However, in any case, the solder is not sealed against the anode lead which would result in shorting the capacitor, and the solder graphite interface is necessarily exposed in the region of the anode. Since it is difficult to produce a tightly adhering thick solder coating to a graphite layer, and further since a graphite layer is permeable to gasses, any organic vapors generated in the package will enter in this anode region.

It is therefore an object of the present invention to provide an improved counterelectrode means in a solid valve metal capacitor.

It is a further object of the present invention to provide a low cost solid valve-metal capacitor.

It is a further object of this invention to provide a solid valve-metal capacitor having superior performance characteristics especially after exposure to elevated temperatures.

It is yet a further object of this invention to provide a solid valve-metal capacitor having a housing of an inexpensive organic material, that is capable of exposure to soldering processes involving temperatures as high as 360°C for several minutes without degradation.

SUMMARY OF THE INVENTION

A solid valve-metal capacitor comprises a porous valve-metal body, a valve-metal oxide film grown over the surfaces of the body, and an overlying coating of manganese dioxide ($MnO_2$) wherein a conducting member is partially embedded. The embedded portion has an inert surfce so as not to react with the adjacent $MnO_2$. Thus the conductive member is made of a noble metal such as gold, or is a base metal with a noble metal film deposited thereon, or is a base metal having an adjacent layer of graphite. An extended portion of the conductive member serves as the cathode lead. Thus the interface between the $MnO_2$ and the counterelectrode of this invention is buried within the $MnO_2$ coating of the capacitor and reducing vapors to which the capacitor may be subsequently exposed will react essentially only with the exposed outer surfaces of the $MnO_2$ covering, with no degrading effects on the performance characteristics of the capacitor. Also the counterelectrode and cathode lead of this invention may be generally more economical of material and necessary processing steps. Finally, the capacitor is enclosed within an organic housing material such as molded thermoplastic resins, epoxy or silicone resins. Such housings are known to produce reducing vapors, especially at elevated temperatures, that degrade the performance of conventional solid valve-metal capacitors.

Exposure of the capacitor of this invention to any reducing materials or vapors results in conversion of the outer surface regions of the $MnO_2$ to a lower oxide of manganese, which dissipates the reducing material in a region of the solid electrolyte that is not electrically functional. Also the electrically functional portions of the $MnO_2$ layer between the counterelectrode and the body is more dense and impervious to vapors than in a conventional capacitor structure. The capacitor of this invention is superior to capacitor structures, such as that having a metallized body as previously described, which may depend on a metal encasement as a mere barrier to reducing vapors wherein any degree of porosity and vapor permeability and any defect in the seal will admit reducing vapors to the functionally active $MnO_2$. The solid valve-metal capacitors of this invention have inexpensive organic housings and are capable of being subjected to solder attachment processes at temperatures as high as 360°C for up to 3 minutes without degradation of their electrical properties.

BRIEF DESCRIPTION OF THE DRAWINGS

FIG. 1 shows a tantalum body of this invention having first $MnO_2$ coatings and having a wire wrapped thereabout.

FIG. 2 shows a sectional view of the completed capacitor having final coatings of $MnO_2$, having the wrapped wire of FIG. 1 buried therein, and having an organic housing thereabout.

FIG. 3 shows a detail of FIG. 2 enlarged.

FIG. 4 shows a solid tantalum body with first $MnO_2$ coatings and a sheet metal counterelectrode lying thereover.

FIG. 5 shows the side sectional view of the completed capacitor of FIG. 4 having final coatings of graphite and $MnO_2$ applied, and an organic housing thereabout.

FIG. 6 shows an $MnO_2$ coated tantalum body positioned in a wire screen counterelectrode.

DESCRIPTION OF THE PREFERRED EMBODIMENTS

A first preferred embodiment of this invention is shown in FIGS. 1, 2 and 3. A cylindrical porous body 10 having been formed by compressing tantalum powder in a mold and sintering, has a tantalum lead 11 projecting therefrom and serving as the capacitor anode lead. More generally, the capacitors of this invention employ porous valve-metal bodies where valve-metals include tantalum, aluminum and niobium. A tantalum oxide dielectric film 12 is grown over the surfaces of the body including surfaces within the pores and is simply represented in the drawing as lying over the outer surface of the body 10. The oxide coating extends part way up the anode lead 11. A coating 16a of manganese dioxide lies over and adjacent to the dielectric film 12, which coating is formed by applying manganous nitrate in the pores and over the outer surface of the body and subjecting it to a temperature of about 400°C to pyrolyze and convert the manganese salt to the solid semiconducting $MnO_2$. This coating 16a may be made thicker by repeated applications of the manganous salt followed by pyrolysis. Metal wire 15 is wrapped around the $MnO_2$ coated body, one end of which projects in the same direction away from the body as does the anode lead and serves as the cathode lead of the capacitor. The metal is preferably nickel or copper, although other low cost base metals will be suitable such as iron, and more generally any metal will work. The cathode wire 15 has an outer surface 15a that is inert to $MnO_2$ at temperatures as high as 450°C. The inert surface 15a may be a film of noble metal of noble metal such as platinum and preferably gold. The inert noble metal film may be plated on or applied by other means. Of course the wire 15 may be itself a noble metal requiring no treatment of its surface to make it inert to $MnO_2$.

After the cathode wire 15 has been wrapped around the coated body, an additional coating of $MnO_2$ is applied over the wrapped body so as to bury in a composite $MnO_2$ coating 16 the wrapped portion of the cathode lead 15. This additional coating of $MnO_2$ is formed by the means aforementioned including applying successive coats of manganous nitrate and pyrolyzing after each coat. Care is taken to terminate the composite $MnO_2$ coating 16 near the anode lead where the oxide film 12 can prevent contact and an electrical short between the lead 11 and the $MnO_2$ coating 16. An organic encapsulant 18 serves as a housing for the capacitor.

A second preferred embodiment is shown in FIGS. 4 and 5. A porous valve-metal body 20, preferably being of tantalum, has rectangular profiles. An anode lead 21 of the valve-metal is embedded in or otherwise attached to the body 20 as by welding. An oxide film 22 of the valve-metal is formed over the body 20 and a first $MnO_2$ coating 24a is formed thereover.

A sheet metal part 25 made of an inexpensive base metal such as copper, nickel or steel has finger portions 25a and a tab portion 25b. All but the tab portion 25b, that serves as the cathode lead, is coated with a graphite layer 27.

The graphite coated metal part 25 is placed adjacent to the $MnO_2$ coating 24a of the body 20. The fingers 25a are wrapped around the $MnO_2$ coating 24a and a second $MnO_2$ coating 24b is applied thereover, so as to completely bury the graphite coated portions of the metal piece 25 with a composite coating 24 of $MnO_2$. It is important that the relatively porous graphite layer 27 does not extend to the outer surface of the composite $MnO_2$ coating 24 since any organic vapors may then wick through any exteriorly exposed graphite and enter the active portion 24a of the composite $MnO_2$ coating 24 leading to a reduction of some of the $MnO_2$ within 24a and causing a high impedance cathode circuit condition.

A dashed line 29 in FIG. 5 indicates the location of the boundary between the first 24a and second 24b $MnO_2$ coatings and its relative position within the composite $MnO_2$ coating to the graphite coated and wrapped portions of the buried metal piece 25. The capacitor is enclosed in an organic housing 28.

In a third preferred embodiment a metal bar or more particularly a wire 39 is shown attached by welding or other suitable means to a formed metal wire screen 35 in FIG. 6. A tantalum body 34a having at least one layer $MnO_2$ thereon, is placed in the formed portion of the wire screen 35. The wire screen is formed so as to be conformal and in contact with the body 34a. The anode wire 31 is seen projecting from the body 34a and a portion of the oxide dielectric 32 is seen extending beyond the $MnO_2$ covering, avoiding bridging or shorting between the underlying tantalum or anode lead 31 and the $MnO_2$ in conventional manner. A weld region 36 is indicated between the wire screen 35 and cathode lead wire 39. In a similar manner to the first and second preferred embodiments, one or more successive layers of $MnO_2$ are applied as in the second preferred embodiment over the screen wire 35 and the body 34a so as to embed the screen 35 in a manganese dioxide covering (not shown).

In the three preferred embodiments as described above it will be recognized that a conductive counterelectrode member having any of several forms is partially embedded within the solid electrolyte covering of a capacitor. In view of the previously noted knowledge concerning the readiness of $MnO_2$ to be reduced by most metals, and since the lower oxide of manganese is a poor conductor and further since most metal oxides are poor conductors, if such reduction and oxidation does occur at the interface of the $MnO_2$ and the metal member than the capacitor will exhibit a high series resistance or will appear to be open circuited. Therefore in the practice of this invention at least a substantial part of the surface of the embedded portion of said embedded conductive member is made of an inert conductive material such as a noble metal or graphite. Of practical importance is the fact that some surface portions of the embedded conductive member need not be inert. This may result in localized formation of nonconducting oxides and localized reduction of $MnO_2$ to lower and nonconducting oxides of manganese, but will result in no substantial degradation of the performance characteristics of the capacitor as long as a substantial portion of the embedded member is inert.

A noble metal surface may be realized by any one of presently known means such as by employing a solid noble metal as the embedded conductive member, or employing a base metal and plating or otherwise depositing a noble metal on its surface. A preferred means consists of depositing gold by plating. Iron and nickel are preferred among the base metals for the practice of this invention.

A number of experimental capacitors were made approximately in accordance with the first preferred embodiment described above. The tantalum body however was rectangular having the dimensions 0.125 × 0.180 × 0.018 in inches. Four or five turns of a 0.010 diameter gold wire was wrapped around and over the initial $MnO_2$ coating of each body essentially as is shown in FIG. 1. Platinum is also inert in $MnO_2$ at pyrolyzing temperatures and is considered to be a good substitute for gold. The units were again dipped into a solution of $Mn(NO_3)_2$ and pyrolyzed in steam at 300°C. The dipping and pyrolyzing steps were repeated from three to five more times.

These experimental capacitors were all characterized as having about 1.5 microfarads rated at 35 volts d.c. Leakage currents ($I_L$), dissipation factor (D.F.) and impedance (Z) at 1 megahertz were measured and are presented in Table I.

Table I

| Example | $I_L$ (μ-amps) | D.F. (%) | Z (ohms) |
|---|---|---|---|
| 1 | 0.44 | 0.9 | 0.50 |
| 2 | 0.18 | 0.9 | 0.61 |
| 3 | 1.7 | 0.7 | 0.31 |
| 4 | 4.8 | 0.7 | 0.48 |
| 5 | 4.7 | 0.7 | 0.51 |

These units were subsequently heated to 360°C for 3 minutes and as the data in Table II indicates, all of these key parameters were even somewhat improved.

Table II

| Example | $I_L$ (μ-amps) | D.F. (%) | Z (ohms) |
|---|---|---|---|
| 1 | 0.26 | 0.7 | 0.39 |
| 2 | 0.07 | 0.7 | 0.31 |
| 3 | 0.02 | 0.6 | 0.36 |
| 4 | 1.00 | 0.6 | 0.24 |
| 5 | 0.48 | 0.7 | 0.27 |

Subsequently an organic package material 18 was formed about the experimental capacitors. This was accomplished by dipping each capacitor in a fluid mixture of a silicone resin, particles of mica and solvents of xylene and butyl acetate. This resin dip-coat was then cured by first heating at 85°C for 30 minutes and then heating at 250°C for 60 minutes. Measurements were again taken and again insubstantial changes resulted from the dip-coat process as seen from the data in Table III.

Table III

| Example | $I_L$ (μ-amps) | D.F. (%) | Z (ohms) |
|---|---|---|---|
| 1 | 0.43 | 0.7 | 0.32 |
| 2 | 0.11 | 0.7 | 0.39 |
| 3 | 0.03 | 0.7 | 0.43 |
| 4 | 2.50 | 0.7 | 0.26 |
| 5 | 1.00 | 0.7 | 0.31 |

Finally, the packaged units were subjected to a temperature of 360°C for 3 minutes and key parameters measured once again. The data in Table IV shows that the leakage current ($I_L$) and impedance at $1MH_z$ remained at a low value in each instance while the dissipation factor increased somewhat but still remained well within acceptable limits. The most significant result is that the impedance remained under control and in fact actually dropped in these experimental capacitors of this invention.

Table IV

| Example | $I_L$ (μ-amps) | D.F. (%) | Z (ohms) |
|---|---|---|---|
| 1 | 0.62 | 2.9 | 0.27 |
| 2 | 0.56 | 2.7 | 0.29 |
| 3 | 0.11 | 2.5 | 0.36 |
| 4 | 1.20 | 2.4 | 0.26 |
| 5 | 1.10 | 2.6 | 0.29 |

For comparison, a variety of conventional solid tantalum capacitors, examples 6 through 9, were selected, having a conventional graphite covering applied over the $MnO_2$ coating and a 5% tin 95% lead alloy counterelectrode layer formed over the graphite covered $MnO_2$. These units were subsequently transfer molded in a silicone resin package. The molding resin employed is Dow Corning No. 306. Impedance measurements at $1MH_z$ after molding and after exposure of the molded capacitors to 360°C for 3 minutes were made and this data is shown in Table V.

Table V

| Example | Cap. (μfd) | Voltage (volts) | Z initial (ohms) | Z final (ohms) | $Z_f/Z_i$ |
|---|---|---|---|---|---|
| 6 | 0.15 | 35 | 1.8 | 25 | 14 |
| 7 | 22 | 10 | 0.08 | 1.0 | 12 |
| 8 | 0.68 | 18 | 1.0 | 25 | 25 |
| 9 | 6.8 | 6 | 0.1 | 0.5 | 5 |
| 10 | 1.5 | 35 | 0.61 | 0.43 | 0.7 |
| 11 | 1.5 | 35 | 0.55 | 0.68 | 1.2 |

Examples 10 and 11 represent capacitors made according to this invention that include a molded package of the No. 306 resin, these latter two capacitors being otherwise constructed as those described above, namely experimental units 1 through 5. The capacitors of this invention having a counterelectrode buried with the $MnO_2$ coating clearly provide a highly effective means for preventing the unwanted reduction of the $MnO_2$ coating by reducing organic vapors at high temperatures, to which all known solid valve-metal capacitor bodies have heretofore been prone.

In another experimental capacitor constructed essentially according to the above described second preferred embodiment of this invention and FIGS. 4 and 5, the counterelectrode was made of 0.005 inch nickel foil. A graphite layer was deposited on the nickel foil by dipping it in a 4% aquadag solution and drying. Tests on such units, some with and some without the graphite layer, showed that the graphite layer containing units have a 1MH$_z$ impedance that is an order of magnitude less than those having a bare nickel counterelectrode (9 ohms as compared to 87 ohms).

Photomicrographs of sectioned capacitors of this invention show that the MnO$_2$ layer is clearly more dense in regions adjacent to the valve-metal body and in regions adjacent to the noble metal surface of the buried counterelectrode. On the other hand, such a region of dense MnO$_2$ is not seen adjacent to the outer counterelectrode metal covering of a conventional solid valve-metal capacitor since the MnO$_2$ must be pyrolyzed before this outer metal covering is deposited. It is thus believed that when in a capacitor of this invention the dense regions of MnO$_2$ that are associated with the valve metal body and the buried counterelectrode, respectively, are contiguous or overlapping, then there is advantageously a greatly diminished tendency for vapors to diffuse into this critical region of the MnO$_2$ layer.

What is claimed is:

1. In a solid valve-metal capacitor having a porous valve-metal body, a valve-metal oxide film covering all surfaces of said porous body and a coating of manganese dioxide overlying and in contact with said oxide film; the improvement comprising a conductive counterelectrode member having a surface portion that is inert to manganese dioxide at temperatures as high as 450°C, said inert portion being buried in said manganese dioxide coating and another portion of said member extending outside said coating for the purpose of serving as the cathode lead of said capacitor; and a housing formed of an organic material enclosing said coated body.

2. The capacitor of claim 1 wherein said valve-metal is selected from tantalum, aluminum and niobium.

3. The capacitor of claim 1 wherein said inert counterelectrode material is a noble metal selected from gold and platinum.

4. The capacitor of claim 1 wherein said inert counterelectrode material is a base-metal having a film of a noble metal selected from gold and platinum deposited thereon.

5. The capacitor of claim 4 wherein said base metal is selected from nickel and iron.

6. The capacitor of claim 1 wherein said counterelectrode member is a wire, said embedded portion having a spiral geometry containing said body in a coaxial manner.

7. The capacitor of claim 1 wherein said inert buried portion of said counterelectrode member consists of sheet metal extensions that conformally encompass said body.

8. The capacitor of claim 1 wherein said buried portion is a wire screen and wherein said extended portion of said member is a wire having been welded to said screen.

9. The capacitor of claim 1 wherein said inert buried portion of said counterelectrode member is comprised of a base metal with a layer of graphite thereon, said graphite being completely enclosed within said manganese dioxide coating.

10. The capacitor of claim 1 wherein said organic material of said housing is a molded resin.

11. The capacitor of claim 1 wherein said organic material of said housing is an essentially conformal coating of silicone resin.

* * * * *